United States Patent [19]

Baker et al.

[11] 4,341,454
[45] Jul. 27, 1982

[54] SELF-DEVELOPING PHOTOGRAPHIC APPARATUS WITH MULTIPLE TIMERS

[75] Inventors: Philip G. Baker, Peabody; Gerald L. Matthews, Raynham, both of Mass.

[73] Assignee: Polaroid Corporation, Cambridge, Mass.

[21] Appl. No.: 292,237

[22] Filed: Aug. 12, 1981

Related U.S. Application Data

[62] Division of Ser. No. 152,858, May 23, 1980, Pat. No. 4,300,827.

[51] Int. Cl.³ ............................................. G03D 5/02
[52] U.S. Cl. ................................. 354/304; 354/86; 116/213
[58] Field of Search .................... 354/83, 84, 85, 86, 354/87, 289, 297, 304; 116/202, 213

[56]  References Cited

U.S. PATENT DOCUMENTS

| | | | |
|---|---|---|---|
| 2,741,961 | 4/1956 | Anton | 354/83 |
| 3,270,652 | 9/1966 | Mason et al. | |
| 3,396,649 | 8/1968 | Bishop et al. | |
| 3,522,766 | 8/1970 | Wolbarst | |
| 3,543,663 | 12/1970 | Lyon | |
| 3,608,454 | 9/1971 | Shenk | |
| 3,625,126 | 12/1971 | Land | |
| 3,653,760 | 4/1972 | Johnson | |
| 3,672,275 | 6/1972 | Johnson | |
| 3,678,832 | 7/1972 | Dietz et al. | |
| 3,697,175 | 10/1972 | Sullivan | |
| 3,726,198 | 4/1973 | Bjork et al. | 116/202 |
| 3,796,485 | 3/1974 | Seiden | |
| 4,044,365 | 8/1977 | Pizzuti et al. | |

Primary Examiner—L. T. Hix
Assistant Examiner—Alan Mathews
Attorney, Agent, or Firm—John S. Vale

[57] ABSTRACT

A self-developing slide copier or printer configured to be supported on a support surface and operable for effecting distribution of a fluid processing composition between sheets of a self-developing film unit in response to manually withdrawing or pulling the film unit along a preferred exit path has its film receiving housing set at a predetermined angle on a support frame so that the preferred exit path will fall within a range of natural pull paths along which an operator most likely will pull the film unit to withdraw it from the housing. The printer is also provided with multiple timers for separately timing a predetermined imbibition period for each of a plurality of sequentially processed film units.

5 Claims, 10 Drawing Figures

SELF-DEVELOPING PHOTOGRAPHIC APPARATUS WITH MULTIPLE TIMERS

This is a division of application Ser. No. 152,858, filed May 23, 1980, now U.S. Pat. No. 4,300,827.

BACKGROUND OF THE INVENTION

The present invention relates to the field of photography and, more specifically, to photographic apparatus, such as a self-developing slide copier or printer configured to be supported on a table or desk, for effecting distribution of a fluid processing composition over an area of a self-developing film unit in response to manually withdrawing the film unit from the apparatus.

There are numerous self-developing photographic apparatus (cameras; slide copiers or printers; camera backs; etc.) configured for use with self-developing film units that are processed after exposure by manually advancing the film unit between a pair of pressure-applying rollers to rupture a pod at the leading end of the film unit holding a supply of fluid processing composition and effecting distribution of the fluid over the film unit image forming area between superposed negative and positive sheets. Following a suitable imbibition period, the sheets are manually separated to reveal a positive image print on the positive sheet. Examples of such film units include 665 and 668 Polaroid Land Film manufactured by Polaroid Corporation, Cambridge, Mass. The 665 film is a black and white film having an imbibition period of approximately 20 seconds; and the 668 film is a color film having an imbibition period of approximately 1 minute.

To optimize the uniformity of fluid distribution, it is highly desirable that the film unit be manually withdrawn along a preferred straight exit path that is symmetrically disposed with respect to the pair of juxtaposed pressure applying rollers. That is, the exit path should be substantially perpendicular to a plane that passes through the rollers and contains a film gap therebetween. While minor deviations from the preferred exit path are tolerable without seriously degrading the uniformity of the fluid distribution, substantial deviations from the preferred path, wherein the film unit is acutely inclined toward one of the pair of rollers, should be avoided because fluid distribution may become nonuniform to the point where some portions of the image area are treated with the processing fluid.

When an operator manually pulls the film unit from a self-developing photographic apparatus, he or she will most likely use a natural pulling motion without giving much thought to consciously withdrawing the film unit along the preferred exit path. Therefore, handheld self-developing cameras of this type have been provided with numerous devices, such as selectively pivoting handles, camera holding straps, and film motion guides, for automatically adjusting the orientation of the camera body to the operator's "natural pull path" or, in the case of the film guide, for altering this natural pull path so that the film is withdrawn along or in close proximity to the preferred film exit path. For examples of self-developing cameras having such film withdrawal aids, reference may be had to commonly-assigned U.S. Pat. Nos. 3,522,766; 3,543,663; 3,625,126; 3,672,275; 3,678,832; and 4,044,365.

On the other hand, fixedly mounted self-developing photographic apparatus of this type that are configured to be supported on a table or desk when in operation generally do not include structure for aiding the user in withdrawing the film unit along the preferred exit path, which may be described in an accompanying instruction booklet as being parallel, or in some instances perpendicular to, the table top surface on which the apparatus is supported. In many instances, the operator will not remember to withdraw the film along this preferred exit path but rather will revert to the natural pulling motion so that the film is advanced along a natural pull path which deviates from the preferred exit path. Examples of such photographic apparatus in which the preferred film exit path is generally parallel to a table top support surface may be found in commonly-assigned U.S. Pat. Nos. 3,270,652 and 3,396,649. An example of an apparatus requiring that the film unit be withdrawn along a preferred path that is substantially perpendicular to the support surface may be found in commonly-assigned U.S. Pat. No. 3,796,485.

To aid the operator in timing the proper imbibition period, some self-developing cameras have been provided with a built-in timer system. For example, see commonly-assigned U.S. Pat. No. 3,608,454 which has an electronic timer that is actuated by a signal provided in response to withdrawing a film unit from the camera. The system may include a light which remains illuminated during the entire timed cycle and an electronic buzzer which provides an audible signal at the end of the timed cycle.

In many instances, it is desirable to process a plurality of film units in rapid sequence whereby their respective imbibition periods overlap. Because each film unit must be timed separately, and the camera only includes a single timer, the operator is forced to rely on auxiliary timing means such as his wristwatch or a wall clock to insure proper processing of the several film units. The use of multiple timing sources tends to be confusing and may lead to incorrectly timing the imbibition period of one or more of the sequentially processed film units.

Therefore, it is an object of the present invention to provide a self-developing photographic apparatus configured to be supported on a support surface and having its components arranged to take advantage of a natural pull path along which an operator most likely will pull the film unit to withdraw it from the apparatus so that fluid distribution is optimized.

It is another object of the invention to provide such an apparatus including structure for separately timing a predetermined imbibition period for each of a plurality of sequentially processed self-developing film units.

It is yet another object to provide such an apparatus that is simply constructed and easy to use.

Other objects of the invention will, in part, be obvious and will, in part, appear hereinafter.

SUMMARY OF THE INVENTION

The present invention provides a photographic apparatus, such as a self-developing slide printer, configured to be supported on a support surface and operable for effecting distribution of a fluid processing composition over an area of the self-developing film unit in response to manually withdrawing or pulling the film unit from the apparatus. The apparatus includes a housing for receiving such a film unit and having a film withdrawal opening through which the film unit is pulled along a preferred exit path, exteriorly of the housing, to optimize fluid distribution; and a support frame for supporting the apparatus on the support surface with the housing arranged so that the preferred exit path is inclined with respect to the support surface and is within a range of natural pull paths along which an operator most likely will pull the film unit to withdraw it from the housing.

In a preferred embodiment the slide printer is adapted to be supported on a horizontal surface at table top height and the housing is mounted on the support frame at an angle so that the preferred film exit path is inclined away from the support surface at an angle of approximately 10-degrees so as to fall within a range of natural pull paths occurring as a result of an operator either sitting or standing when withdrawing the film unit.

The apparatus also includes multiple timers for separately timing a predetermined imbibition period for each of a plurality of sequentially processed self-developing film units. The timing system includes an electrical switch mounted in the path of film advancement for providing an output signal in response to each advancement of a film unit relative to a film processing assembly; a plurality of timers (3 in the illustrated embodiment) each being operable upon actuation for timing the predetermined imbibition period; and a circuit responsive to an output signal for selecting an actuating one of the plurality of timers to time the imbibition period of a corresponding processed film unit and also being configured so that the plurality of timers are actuated in a predetermined sequence in response to successive output signals.

The support frame of the apparatus is configured to facilitate loading a film pack into the film receiving housing. Accordingly, the support frame includes a first section for supporting the apparatus at an operative position on the support surface wherein the housing is adjacent the support surface; and a second support section for supporting the apparatus at an inoperative position to present the housing at a location further away from the support surface to facilitate loading film units thereinto.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
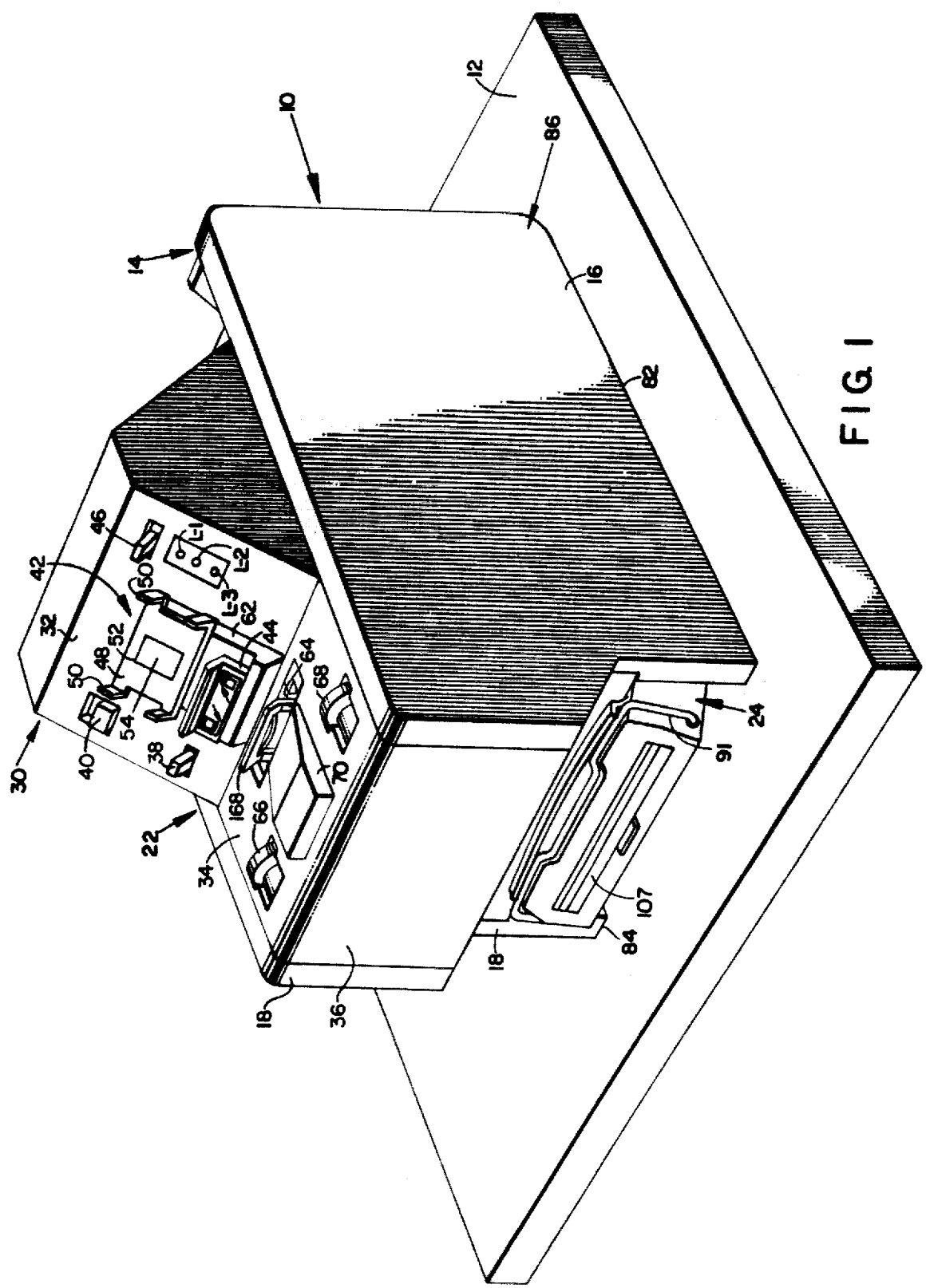
FIG. 1 is a front perspective view of a self-developing slide copier or printer shown in its operative position on a support surface.

A photographic copy apparatus embodying the present invention, such as the illustrated self-developing slide copier or printer 10 for making enlarged reflection print copies from 35 mm slide transparencies, is shown in FIG. 1 in its upright operative position resting on a horizontal support surface 12.

Surface 12 is intended to represent the top of a conventional table or desk on which printer 10 is supported at a suitable height for convenient use when the operator is in either a standing or sitting position.

Figure 2:
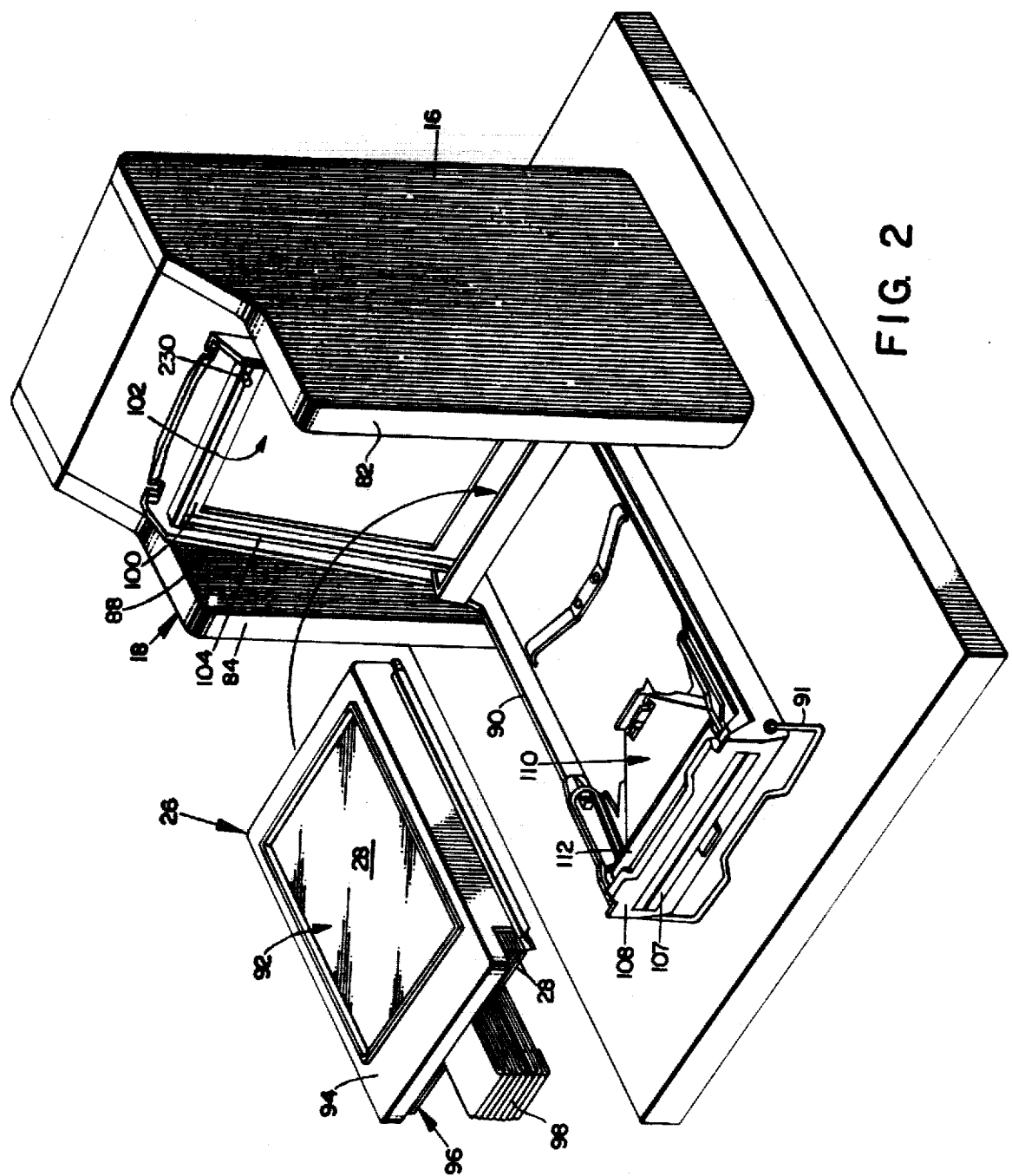
FIG. 2 is a perspective view showing the printer in an inoperative position in preparation for loading a film pack thereinto.
Figure 3:
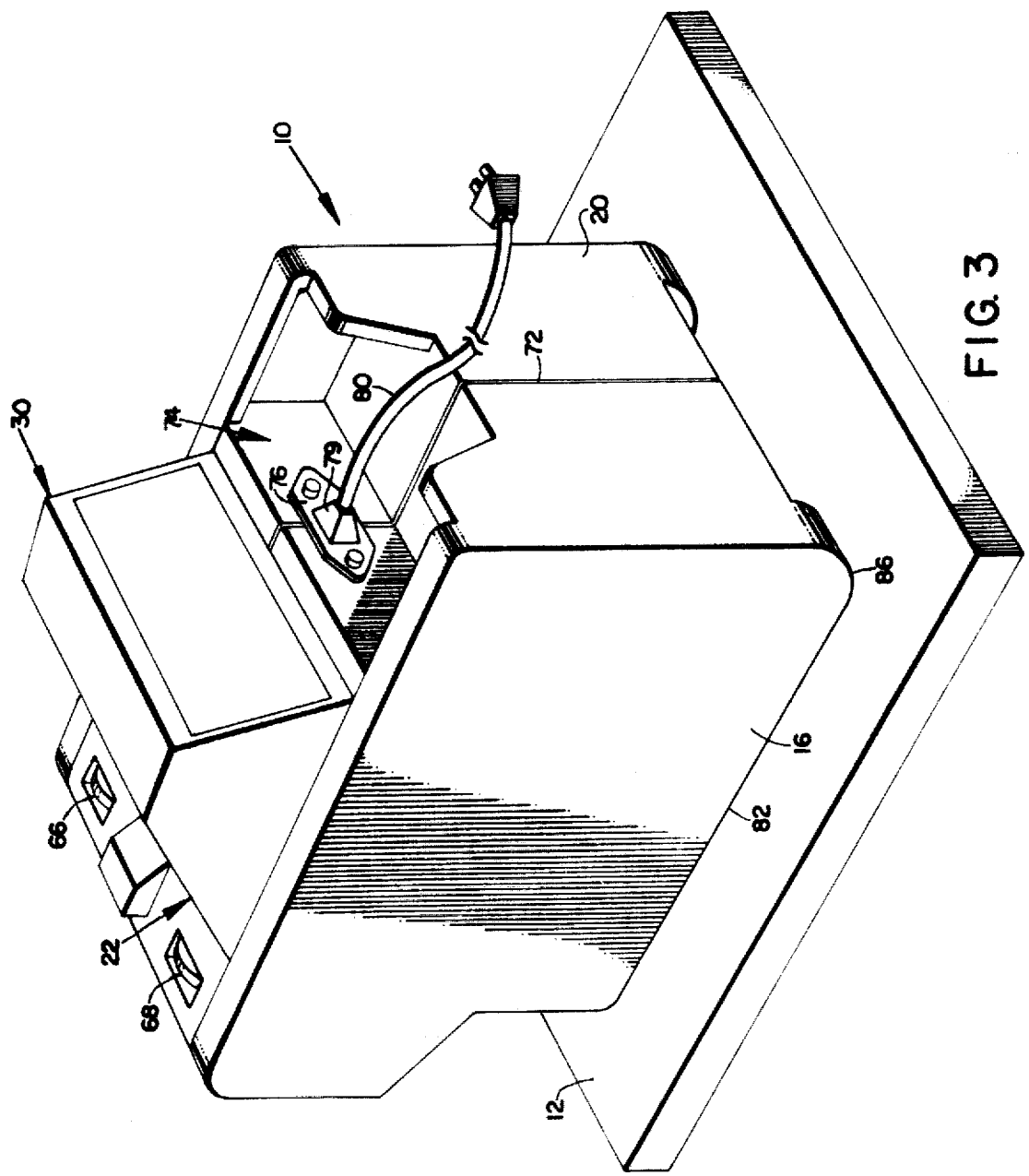
FIG. 3 is a rear perspective view of the printer shown in its operative position.

As best shown in FIGS. 1, 2 and 3, printer 10 includes a support frame 14, defined in part by a pair of opposed laterally spaced side walls 16 and 18 and a trailing end wall 20; an upper housing section 22 disposed between side walls 16 and 18; and a lower housing 24 mounted at a predetermined angle on frame 14 below housing 22 for receiving and supporting a film pack or container 26 holding a plurality of self-developing film units 28 arranged in stacked relation therein.

As best shown in FIG. 1, the upper housing 22 includes an upstanding rearward section 30 including a forwardly facing inclined wall 32; and a bottom portion that is flush with the tops of side walls 16 and 18 and includes a horizontal top wall 34 and a leading end wall 36.

Mounted on incline wall 32 is a power on/off switch 38; an exposure cycle actuating button 40; a slide preview station 42 including a slidably mounted cropping selector bar 44; three timer indicating lamps or light emitting diodes designated L-1, L-2 and L-3; and a timing interval selector button 46. The slide preview station 42 includes a base plate 48 having two pairs of integrally formed laterally spaced fingers 50 thereon for frictionally engaging the lateral edges of a 35 mm slide mount to position the image area of the slide over a central aperture 52 in base plate 48 that is covered with a translucent piece of glass or plastic 54.

Figure 4:
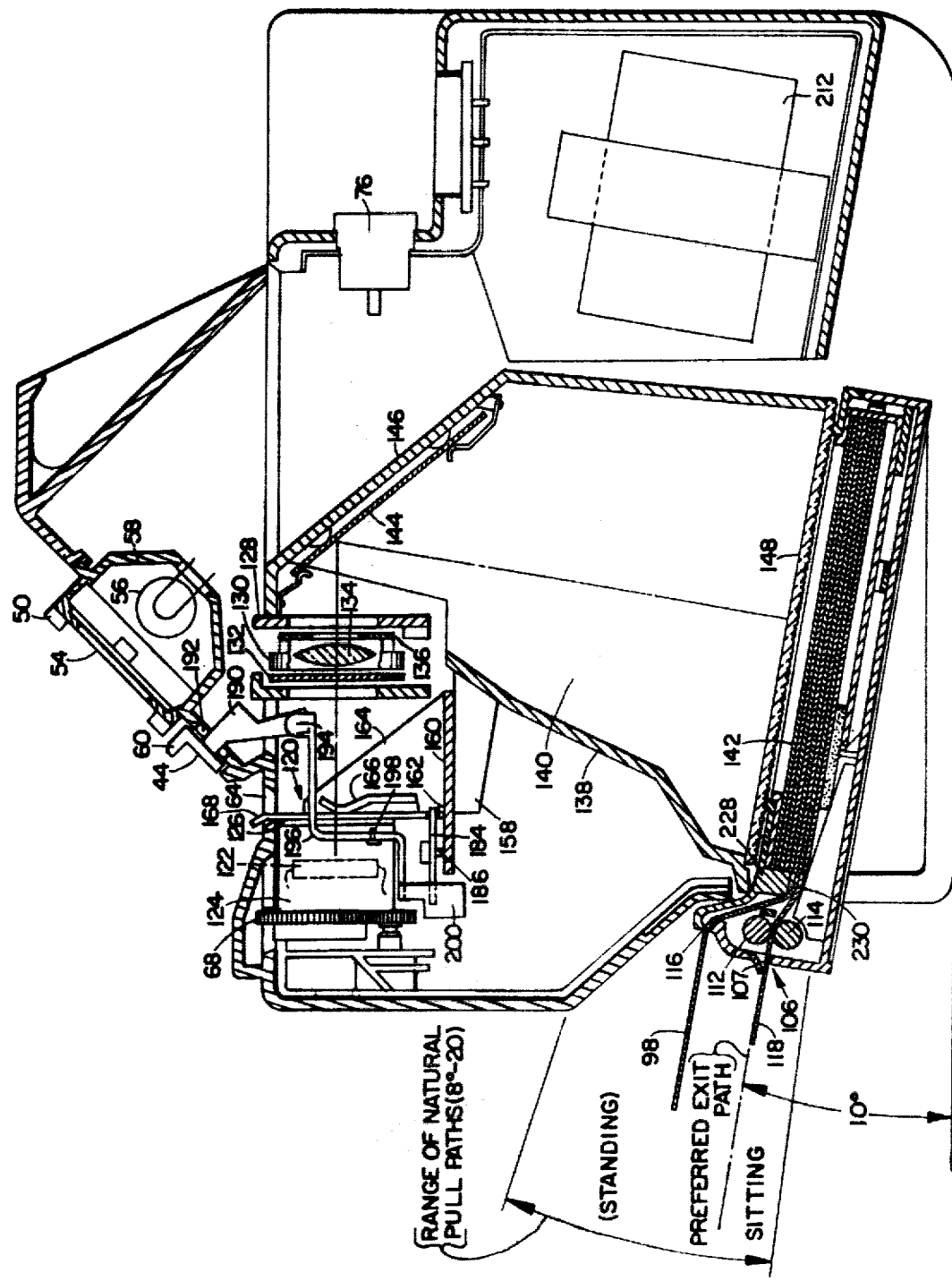
FIG. 4 is a cross-sectional view, partly in section, of the printer.

As best shown in FIG. 4, translucent glass 54 is backlighted by means of a lamp 56 located in a lamp receptacle 58 on the backside of wall 32. The bottom edge of the slide mount rests against an upstanding rib 60 integrall formed with the cropping selector bar 44 which is mounted on a pedestal 62 on the lower portion of wall 32 for lateral sliding movement. Details of the cropping system will be set forth later in the disclosure.

Accessible on the horizontal wall 34 of housing 22 is a laterally extending slot 64 providing entry to a later-to-be-described slide holder; an exposure control or lighten/darken adjustment wheel 66; and a contrast adjustment wheel 68. The upstanding cap 70 between wheel 66 and 68 provides clearance for certain components of a later-to-be-described electronic strobe or flash illumination system.

In the illustrated embodiment, the support frame 14 is formed by two molded piece parts which are joined together along a longitudinal center line best indicated by a seam 72 shown in FIG. 3. Integrally formed in the upper rear portion of frame 14 is a well or trough 74 having an AC power cord plug receptacle 76 mounted on wall 78 of well 74 for receiving the output plug 79 of power cord 80. When printer 10 is not in use, well 74 serves as a convenient receptacle for storing the coiled power cord 80.

From FIGS. 1 and 3, it will be seen that the bottom or underside surfaces 82 and 84 of side walls 16 and 18 serve as a first support means for supporting the printer at its operative position wherein the film receiving housing 24 is adjacent the support surface 12. To facilitate loading a film pack 26 into housing 24 printer 10 is provided with second support means in the form of the exterior surface of rear wall 20 of frame 14 for supporting the printer at an inoperative pack loading position of FIG. 2 thereby presenting the film receiving housing 24 at a location further away from the support surface 12 to facilitate loading the film pack 26 into housing 24. Thus the first supporting means is defined by a bottom portion of frame 14, namely underside surfaces 82 and 84 and the second support means is on a rear portion of the frame (i.e. wall 20) in approximately perpendicular relation to the bottom portion of the frame.

To aid the operator in manually pivoting printer 10 between its operative and inoperative positions, the lower rear corners 86 of frame 14 are preferably rounded. By locating the plug receptacle 76 forwardly of rear wall 20, the printer 10 may be moved to its inoperative position of FIG. 2 where it rests on wall 20 without interference from either the plug receptacle 76 or the power cord 80.

As best shown in FIGS. 2 and 4, the film receiving housing 24 comprises an upper housing section 88 fixedly secured to frame 14 between side walls 16 and 18 so as to be inclined at a preferred angle with respect to bottom support surfaces 82 and 84; and a lower housing section 90 pivotally coupled to housing section 88 at their respective trailing ends for movement between the open film loading position of FIG. 2 and the closed operative position of FIGS. 1 and 4. A bail latch member 91, provided on the leading end of housing section 90, releasably maintains housing 24 in the closed position.

The film pack 26 is a generally box-like structure having a rectangular exposure aperture 92 in its forward wall 94 and a film withdrawal opening 96 at its leading end. Projecting forwardly beyond withdrawal opening 96 is a stack of film manipulation tabs 98.

The illustrated film pack 26 is intended to represent a pack of 665 or 668 Polaroid Land Film marketed by Polaroid Corporation, Cambridge, Mass. Each of the self-developing film units 28 therein includes leader connected positive and negative sheets and a rupturable pod of fluid processing composition. Following exposure of the negative sheet of the forwardmost film unit through exposure aperture 92, the user manually pulls on the first tab 98 which causes the negative sheet to be brought around to the bottom of the pack and into superposition with its corresponding positive sheet. Also, this motion causes a later-to-be-described leader to be advanced through withdrawal opening 96 in pack 26, between a pair of pressure-applying rollers in housing section 90 and out through a film withdrawal opening therein. Using the leader, the operator manually pulls the film units between the pressure-applying rollers for effecting discharge of the processing fluid from the rupturable pod and its distribution over an area of the film unit between the facing negative and positive sheets to initiate a well-known development and diffusion transfer process. Following a suitable imbibition period, the two sheets are separated to reveal a positive print on the positive sheet.

The upper housing section 88 includes an top wall 100 having a rectangular exposure aperture 102 therein; and a rectangular frame 104 for replaceably receiving and supporting film pack 26 therein so that its exposure aperture 92 is in registration with exposure aperture 102.

The lower housing section 90 includes a film withdrawal opening 106 covered by a pivoting door 107 in its leading end wall 108 in front of a film processing assembly 110 that includes a pair of juxtaposed pressure-applying rollers 112 and 114.

As best shown in FIG. 4, when housing 24 is in its closed operative position, the film pack 26 is supported therein to locate the forwardmost film unit 28 in position for exposure and the withdrawal opening 96 of pack 26 adjacent to the pressure-applying rollers 112 and 114. The pull tabs 98 extend out of the leading end of housing 24 through an upper opening 116 therein. For visual clarity, only one tab 98 is shown in FIG. 4. In response to pulling tab 98 outwardly through opening 116 the aforementioned corresponding leader 118 of the forwardmost film unit is advanced through a gap between rollers 112 and 114 and out through the film exit opening 106. Leader 118 has sufficient stiffness to deflect door 107 to its unblocking position shown in FIG. 4. Thereafter, the operator pulls on leader 118 to advance the film unit between rollers 112 and 114 for processing thereby withdrawing the film unit 28 from housing 24 through the opening 106.

As will be described later, film unit 28 should be manually pulled along a preferred exit path that is symmetrically disposed with respect to the rollers 112 and 114 for optimized fluid distribution and that housing 24 is advantageously inclined with respect to support surface 12 when printer 10 is in its operative position so that the preferred exit path will fall within a range of natural inclined pull paths along which an operator most likely will pull the film unit 28.

As best shown in FIGS. 4, 5, 6 and 8, a 35 mm slide transparency to be copied is inserted through access opening 64 into a slide holder 120 that accurately locates and supports the slide in position for image projection. Projection and exposure illumination is provided by a quenchable electronic flash unit mounted in front of slide holder 120 and including a gas discharge tube 122 disposed in a generally cubical reflector 124. An opal glass plate 126 or any other suitable diffuser is positioned between the light output face of the flash unit and the holder 120 to diffuse the light emitted from tube 122 so that substantially uniform illumination is provided over the image area of the slide.

Located rearwardly of holder 120 is a lens and shutter housing 128 that encloses a rotatably mounted lens and diaphragm assembly 130; and a pivotally mounted solenoid operated shutter blade 132 movable between positions blocking and unblocking transmission of image forming light through an objective lens 134 and a diaphragm plate 136 having an elliptical aperture therein, both forming part of assembly 130.

Located rearwardly of housing 128 is a hollow cone assembly 138 that defines an exposure chamber 140 between the lens and shutter housing 128 and an exposure or film plane 142 where the forwardmost film unit 28 in pack 26 is located when pack 26 supported at its operative position within housing 24.

The optical path from lens 134 to plane 142 is folded by means of a mirror 144 mounted on an inclined wall section 146 of cone assembly 138.

In a preferred embodiment, printer 10 includes a contrast control system formed in part by a light transmissive lenticular screen 148 mounted at the bottom of cone 138 over the exposure aperture 102 in housing section 88.

As explained in detail in commonly-assigned copending application U.S. Ser. No. 040,668, filed on May 21, 1979 by W. T. Plummer, now U.S. Pat. No. 4,272,186, the contrast range of the resulting print may be adjusted within certain limits by rotating the lens and diaphragm plate assembly 130 about the optical axis. In response to such rotation, the orientation of the elliptical aperture in plate 136 is changed with respect to the longitudinal axes of the lenticules in plate 148 thereby varying the relative intensitites of adjacently positioned microimage portions projected onto the film unit by plate 148 to adjust the contrast ratio.

Figure 5:
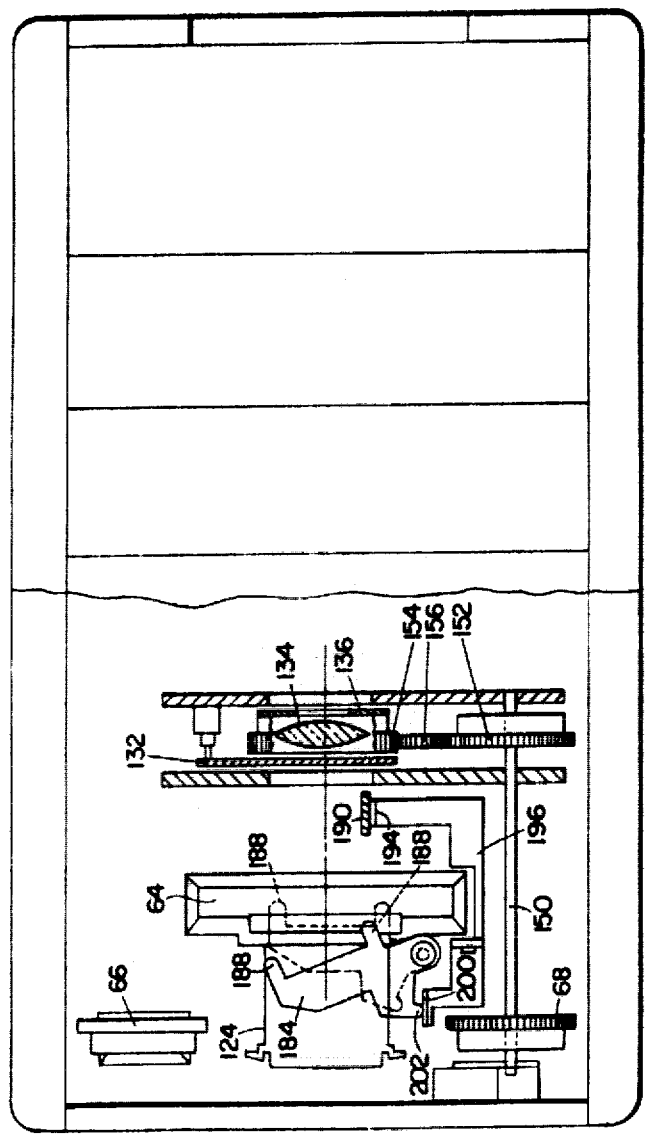
FIG. 5 is a plan view of the printer having a portion cut away to show internal components.

As best shown in FIG. 5, rotation of lens and diaphragm assembly 130 is accomplished by the manual rotation of contrast adjusting wheel 68. Wheel 68 is connected by a shaft 150 to a gear 152 that is in turn to a gear section 154 formed about the periphery of assembly 130 by means of an intermediate pinion gear 156. Because the contrast control system does not form part of the present invention, it will not be described further herein. As noted earlier, a detailed explanation of this system may be found in the above-noted copending application.

The slide holder 120 is supported under access opening 64 by means of a cantilevered support beam 158 secured to cone assembly 138. The holder includes a horizontal base plate 160 mounted on beam 158 and having an upstanding slide locating stop or pedestal 162 disposed thereon in alignment with opening 64. Secured to the lateral margins of base plate 160 are a pair of oppositely spaced triangular shaped upstanding stanchions 164, each having integrally formed therein an inwardly extending resilient slide support spring member 166.

In the illustrated embodiment, holder 120 is configured to receive both the relatively thin cardboard or plastic mounted 35 mm slides and the thicker glass mounted slides. When the thin standard mount slides are used, holder 120 includes a slidably inserted apertured adapter plate 168 positioned between the diffusing plate 126 and the slide support springs 166.

Figure 6:
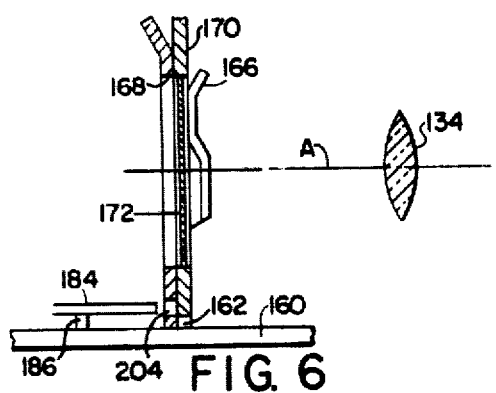
FIG. 6 is an elevational view of a slide holder forming part of the printer showing a slide at its fully inserted position therein.
Figure 8:
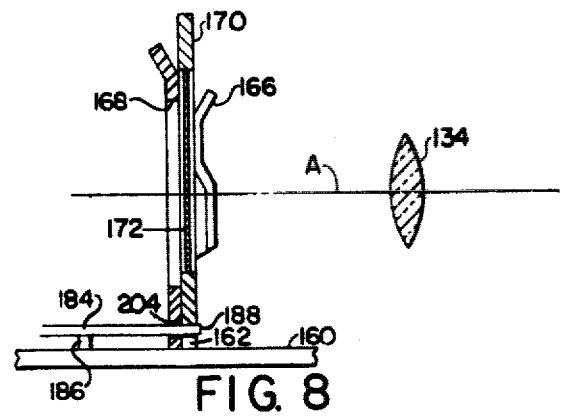
FIG. 8 is similar in some respects to FIG. 6 but shows the slide at a partially inserted position in the holder.

As best shown in FIGS. 6 and 8, the slide mount 170 is inserted between the rearward face of adapter plate 168 and the forward face of the springs 166 which deflect rearwardly to provide a resilient biasing force for holding the slide mount 170 against adapter plate 168. When the slide is fully inserted, the bottom edge of mount 170 rests against the locating pedestal or stop 162 on base plate 160 so that the image area 172 of the slide is asymmetrically disposed with respect to the optical axis A. When the thicker glass mounted slides are used, adapter plate 168 is removed from holder 120. In this situation, the biasing springs 166 urge the slide mount directly against a frame (not shown) holding diffuser plate 126 to support the slide in its operative position with respect to axis A. Again, when the thicker slide is fully inserted, its bottom edge bears against pedestal 162 for correct vertical positioning.

The image area 172 of a standard 35 mm slide is 24 mm wide × 36 mm long, thereby providing a normalized width-to-length ratio of 1:1.5. Generally, standard size photosensitive copy materials including the illustrated self-developing film units 28, having shorter normalized image area formats that usually fall into the range of 1×1 to 1×1.4. For example, the 665 or 668 Polaroid Land Film intended to be used in printer 10 has an image area of 3.25"×4.25" providing a normalized image area format of 1×1.31. In order to fit a projected image from a 35 mm slide onto this film unit so that the width of the projected image fills the width of the film unit image area, it is obvious that a longitudinal portion or portions of the slide image area 172 will have to be cropped.

The optical imaging system and the configuration of slide holder 120 of printer 10 are structured so that when the slide is in its fully inserted position of FIG. 6, the upper and lower shaded longitudinal end portions 174 and 176 will not be projected onto the image area of the forwardmost film unit 28. In other words, when the slide is fully inserted in holder 120, a selected first or central portion 178 of image area 172 that is compatible with the image area format of film unit 28 will be projected thereonto for exposure. Thus, under normal conditions the holder 120 is configured to automatically provide cropping at the opposite longitudinal ends of the slide image area 172. Accordingly, the preview station 42 is designed so that when a 35 mm slide is mounted thereon for viewing, only the first selected portion 178 of its image area 172 is illuminated thereby permitting the operator to observe that portion 178 of the image area 172 that will be automatically copied when the slide is fully inserted into holder 120.

In some instances, it may be more desirable to provide cropping at one longitudinal end of the slide image area 172 rather than eliminating small portions from the top and bottom ends. This will most commonly occur when the top longitudinal end of the image area 172 has unimportant details recorded thereon such as the sky or the upper wall and ceiling portions of a room while the bottom portion includes recorded image information that is important to the subject matter of the picture.

Figure 7:
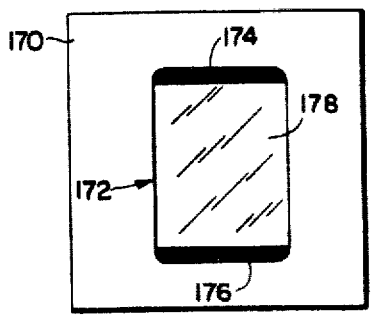
FIG. 7 is a diagrammatic view of a 35 mm slide transparency showing a first portion of its image area which is projected by the printer when the slide is fully inserted in the holder.
Figure 9:
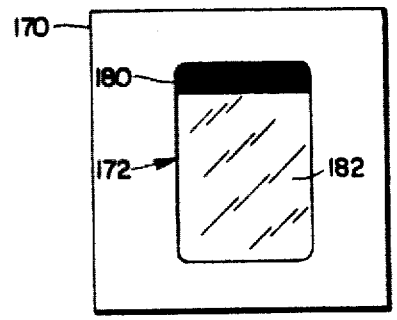
FIG. 9 is a diagrammatic view of a 35 mm slide showing a second portion of its image area which is projected when the slide is at its partially inserted position in the holder.

Accordingly, printer 10 includes an adjustable cropping system that provides the operator with the option to select the standard cropping of FIG. 7 or the alternative format of FIG. 9 where the shaded cropped portion 180 is located on one longitudinal end of the image area 172. In this case, the size of the projected portion 182 is equal to the projected portion 178 shown in FIG. 7. However, because the cropped area 180 is entirely at one longitudinal end of the image area 72, the projected image area 182 represents a second preselected portion of a slide image area 172 that is available for image projection should the operator choose this format.

Printer 10 is provided with structure for changing the cropping format including a slide locating plate 184 (see FIGS. 4, 5, 6 and 8) pivotally coupled to base plate 160 by an upstanding pivot pin 186 thereon for pivotal movement relative to holder 120 between an unblocking position for allowing the slide to be fully inserted into holder 120 (shown in solid lines in FIG. 5); and a blocking position (shown in dotted lines in FIG. 5) wherein a pair of laterally-spaced, rearwardly-extending projections 188 on plate 184 extend into the slide entry path of the holder over pedestal 162 for blocking full insertion and locating the slide at a partially inserted position so that the second selected portion 182 of the slide is located in imaging relation with the optical system for projection onto the film unit 28.

Plate 184 is normally biased toward its unblocking position by a spring (not shown) wherein the projections 188 are retracted so as to be located out of the slide entry path into holder 120.

As noted earlier, printer 10 is provided with a cropping selector bar 44 slidably mounted on pedestal 62, as best shown in FIGS. 1 and 4. Secured to the backside of slider bar 44 is a actuator tab 190 that extends through a slot 192 in pedestal 62 into the interior of housing section 22 so that its lower end engages an upper tab 194 of a pivotally mounted control link 196. Link 196 is pivotally coupled at pin 198 to one of the side stanchions 164 of holder 120 and terminates in a tab 200 at its lower end located in position to engage a projection 202 on plate 184.

When selector bar 44 is located to the left (as viewed in FIG. 1), plate 184 is located in its normal unblocking position. This allows a slide to be fully inserted into holder 120 and provides the first cropping arrangement shown in FIG. 7. However, when selector bar 44 is moved to the right of the position shown in FIG. 1, tab 190 engages tab 194 of link 196 causing it to pivot in a clockwise manner about pin 198 so that its lower tab 200 causes plate 184 to pivot in a clockwise direction about pivot pin 186 thereby locating plate 184 at its blocking position. With plate 184 so located, the slide may be only partially inserted into holder 120 so that the cropping format shown in FIG. 9 results. Should the operator wish to crop section 180 from the bottom of the slide image area 172 rather than the top, he or she would merely turn the slide upside down before inserting it into slide holder 120. As best shown in FIGS. 6 and 8, the adapter plate 168 includes a pair of openings 204 adjacent its bottom edge which allow projections 188 on plate 184 to extend therethrough to the blocking position over pedestal 162. Also in a preferred embodiment tab 190 and/or tab 194 may be made resilient to provide some absorption in the linkage system to prevent damage to the slide mount from plate 184 should the operator attempt to move plate 184 to its blocking position when a slide is fully inserted in holder 120.

To insure uniform fluid distribution between the superposed positive and negative sheets of film unit 28, it is highly desirable that the operator manually pull the film unit along a preferred exit path, exteriorly of housing 24, to advance it between pressure-applying rollers 112 and 114 and out through the adjacent film withdrawal opening 106.

As best shown in FIG. 4, the preferred exit path is equidistant from each of the rollers and is generally perpendicular to a plane passing through the axis of both rollers and containing the gap therebetween. In the illustrated embodiment, the preferred exit path is also generally parallel to the film plane 142. Substantial deviation from the preferred exit path may cause the fluid to be distributed in a nonuniform manner to the point where portions of the film unit image area are not covered with a suitable amount of fluid for proper development.

It has been found that when an operator is in sitting or standing relation to the tabletop height support surface 12, he will tend to naturally pull a film unit 28 out through withdrawal opening 106 along an inclined pull path that slopes away (upwardly) from surface 12 in the direction of the pull. This happens because a natural pulling action is performed with pivotal rather than straight line motion. For example, when the operator is sitting there is a natural tendency to grasp leader 118 with the arm fully extended and locked at the elbow and then pull by pivoting the lower arm at the elbow toward the chest. In the standing position, the pulling action tends to be accomplished by pivoting the whole arm about the shoulder joint. In either case, the natural pull path invariably tends to be inclined upwardly away from support surface 12.

Experimentally, it has been observed that from a sitting position an operator most probably will withdraw the film unit along a natural pull path inclined with respect to support surface 12 at an angle falling in a range of approximately 8°-10°. In the standing position, the natural pull path angle increases and generally falls within a range of 10°-20°. Generally speaking then, from both the sitting and standing positions it is most likely that the natural pull paths utilized to withdraw film unit 28 from housing 24 will be inclined upwardly from surface 12 within a range of 8°-20°.

In order to optimize fluid distribution, printer 10 has housing 24 mounted at an angle on support frame 14 so that when printer 12 is in its upright operative position, the preferred exit path is inclined with respect to surface 12 and falls within the previously-noted range of natural pull paths. That is, housing 24 is disposed with its leading end 108 having film withdrawal opening 106 therein spaced further from surface 12 than the trailing end of housing 24 so that it is inclined away from surface 12 in the direction of film advancement.

In designing the illustrated printer 10, it was assumed that it will be used most often when the operator is in a sitting position with respect to support surface 12 and, advantageously, housing 24 is mounted at an angle of approximately 10° with respect to the bottom support surfaces 82 and 84 on the undersides of side walls 16 and 18. By arranging housing 24 in this manner, there is a much higher probability that the operator will manually pull a film unit 28 along an exit path that is closer to the preferred exit path than if housing 24 were arranged so that the preferred exit path is either parallel or perpendicular to surface 12 as is common in apparatus of this type known in the prior art.

Figure 10:
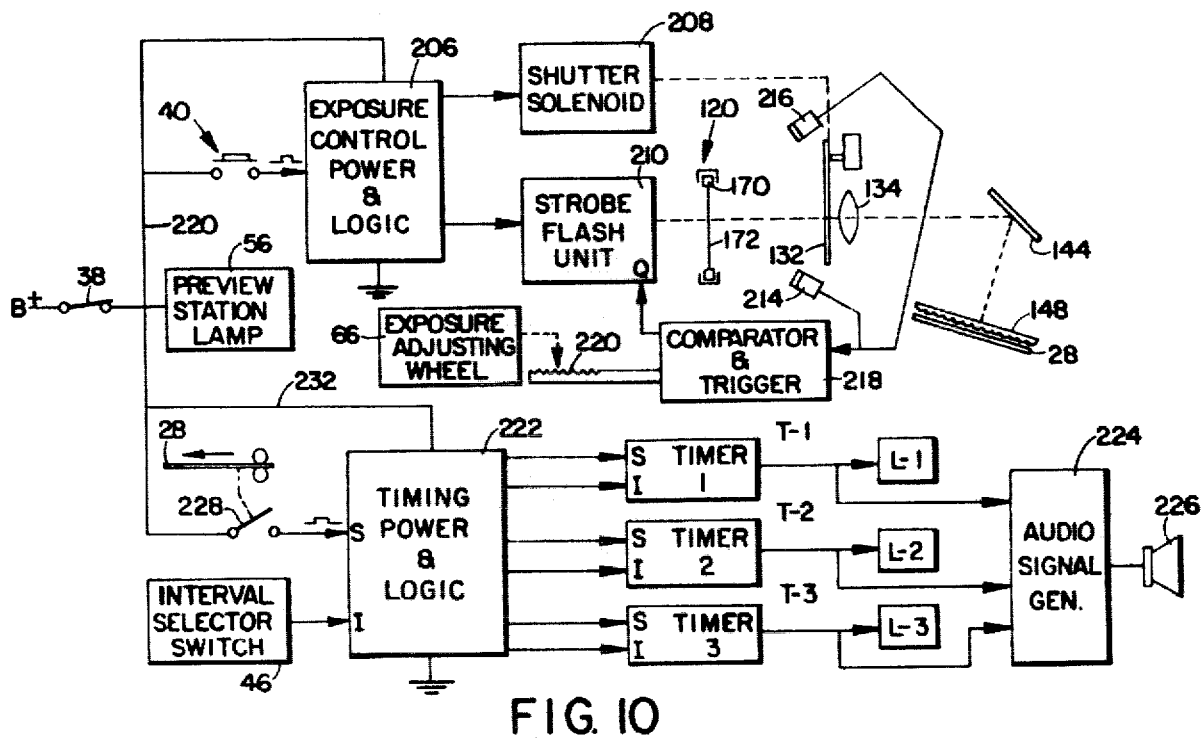
FIG. 10 is a block diagram of the printer's control and timing system.

The printer's automatic exposure control and imbibition period timing systems are shown in functional block diagram form in FIG. 10.

The exposure control system comprises an exposure control power and logic circuit 206 for selectively supplying electrical power to and controlling operation of various system components including a shutter solenoid 208 coupled to shutter blade 132; the strobe flash unit (designated 210 in FIG. 10) including the gas discharge tube 122 in reflector 124 and a step-up voltage transformer 212 mounted in housing 22 below well 74 for supplying high voltage to the strobe unit's capacitor (not shown); a pair of photocells 214 and 216 for monitoring the light intensity level of the selected portion of image area 172 of a 35 mm slide in holder 120 when the image area portion is illuminated by the flash unit 210; and a comparator and trigger circuit 218 for integrating the voltage output of photocells 214 and 216 and comparing it with an internal reference voltage (variable to lighten or darken the resultant print by adjusting potentiometer 220 with wheel 66) and for supplying a trigger signal when these two voltages are equal for quenching the light output of flash unit 210.

When power on/off switch 38 is closed, B+ voltage from an internal power supply unit (not shown) within housing 22 is provided to circuit 206 over line 220. In turn, circuit 206 applies power to flash unit 210 to maintain its capacitor in the full charge state. The shutter blade 132 is spring biased to its normal blocking position and solenoid 208 is in its unenergized state. Also, electrical power is supplied to lamp 56 to illuminate the preview station 42.

After previewing a slide at station 42 and selecting either the first cropping format of FIG. 7 or the second cropping format of FIG. 9 with selector bar 44, the operator removes the slide from station 42 and inserts it into holder 120 through access slot 64.

An exposure cycle is initiated by the manual actuation of switch 40 which causes a pulse signal to be supplied to an input terminal of circuit 206. In response to this signal, circuit 206 energizes solenoid 208 causing shutter blade 132 to move to its unblocking position. At this point, circuit 206 also provides a flash firing input signal to terminal F of flash unit 210. The light intensity level of the illuminated portion 178 or 182 of the slide image area 172 is monitored by the photocells 214 and 216 and when their integrated voltage output level is equal to the set reference voltage level, circuit 218 provides an input signal to terminal Q of flash unit 210 to quench the light output thereby terminating exposure. In response to the quenching of flash unit 210, circuit 206 deenergizes solenoid 208 and shutter blade 132 moves back to its blocking position under the influence of its biasing spring.

The illustrated imbibition interval timing system comprises a timing power and logic circuit 222 for selectively supplying electrical power to and controlling operation of system components including three dual-rate digital timers designated T1, T2 and T3; the previously-noted timer indicating light-emitting diodes L1, L2 and L3; an audio signal generator 224; an electronic buzzer or minispeaker 226; the previously-noted interval selector switch 46; and a film advancement sensor such as the illustrated micro switch 228.

As best shown in FIGS. 2 and 4, switch 228 is mounted on upper housing section 88 just behind rollers 112 and 114 so that its spring biased actuating plunger 230 extends down into the path of travel of a film unit from the withdrawal opening 96 of pack 26 to the bite of the pressure-applying rollers. As the film unit 28 is being advanced, plunger 230 is in engagement with and is depressed by the film unit to set switch 228 in one of its two states. As the trailing end of the film unit 28 passes plunger 230 and becomes disengaged therefrom, the plunger 230 returns to its extended position under the influence of the biasing spring to set switch 228 in the other of its two states.

From FIG. 10 it will be seen that switch 228 is connected between line 220 and the input terminal S (start) of circuit 222 which is energized with B+ voltage over line 232 which power switch 38 is closed. When switch 228 is switched from one of its states to the other in response to advancement of a film unit 28 relative to the processing means (rollers 112 and 114), it provides an output pulse or signal to the input terminal S of circuit 222. Circuit 222 is responsive to this signal for selecting and actuating one of the plurality of three timers to time the imbibition period of the corresponding film unit 28. Switch 228 may be either the normally open or normally closed type. Its only requirement is to provide the output pulse in response to film advancement. As will be explained later, circuit 222 is configured so that the plurality of timers T1, T2 and T3 are actuated in a predetermined sequence in response to successive output signals provided by operation of switch 228.

The interval selector switch 46 is connected to an input terminal I (interval) of circuit 222. When switch 46 is set in one state it causes circuit 222 to provide signals to the input terminals I of each of the three timers to set their timing intervals for 20 seconds—the imbibition period for black-and-white self-developing film units 28. By setting switch 46 in its other state, circuit 222 provides the appropriate signals to set the three timers for a 60-second interval—the imbibition period for color film.

In response to each output signal from switch 228, circuit 222 provides a signal to the input terminal S of a selected one of the three timers to actuate that timer. In turn, the actuated timer provides a signal for energizing its corresponding LED which remains energized for the entire timed interval. Upon deenergization of the LED at the end of the interval, the corresponding timer provides an input signal to circuit 224 which feeds an audio signal to buzzer 226 for one or two seconds thereby providing the operator with an audible indication that the timed interval has ended.

Circuit 222 includes a preprogrammed digital switching subsystem for selecting and actuating the timers in a predetermined sequence. When none of the three timers are in operation, circuit 222 operates in a single timing mode and is responsive to the output signal from switch 228 for automatically actuating T1. If T1 has completed its timing cycle when the next film unit 28 is advanced between the rollers, circuit 222 will automatically select and actuate T1 again.

However, if the next output signal from switch 228 is received before T1 has completed its timing cycle, circuit 222 will operate in a multiple timing mode and automatically select and actuate the next timer T2 in the sequence.

Thus, if any of the three timers are in operation when the output signal from switch 228 is received, circuit 222 will automatically select and actuate the next available timer in this sequence. For example, if T2 is in operation, circuit 222 will actuate T3. If T2 and T3 are in operation, T1 will be actuated. If T1 and T3 are in operation, T2 will be actuated. It will be noted that in the multiple timing mode circuit 222 will select the timers in a repeating sequence T1, T2, T3, T1, etc.

When each of the timers is in operation, its corresponding LED is illuminated and the operator may arrange the processed film units 28 in a corresponding order on surface 12 in accordance with the visual display of illuminated LEDs. At the end of a timing interval, the corresponding LED is deenergized and the audible signal provided alerts the operator that it is time to peel apart the negative and positive sheets of the corresponding film unit. In response to the audible signal, the operator may look at the row of LEDs to ascertain which one has gone out as a double check that he is selecting the correct film unit for the peel apart operation thereby minimizing confusion.

While the circuits of the exposure control and timing systems have been described in functional terms, those skilled in the electronic arts will recognize that these circuits may be constructed with well-known solid state components arranged in any number of well-known configurations to perform the required functions. Inasmuch as many of the functions relate to sequential switching and other common logic functions, it is contemplated that many of the circuits shown in individual blocks may be combined on one or more silicon chips using current integrated circuit techniques. Also, many of the required control and logic functions may be provided by any one of a number of programmable micro processors which are readily available and reasonably priced in today's market.

It should be noted that the cropping system disclosed herein is disclosed and claimed in our commonly-assigned copending application U.S. Ser. No. 152,744 filed on May 23, 1980.

Since certain changes may be made in the above-described printer 10 without departing from the scope and spirit of the invention herein involved, it is intended that all matter contained in the above description or shown in the accompanying drawings shall be interpreted as illustrative and not in a limiting sense.

What is claimed is:

1. Photographic apparatus for separately timing a predetermined imbibition period for each of a plurality of sequentially processed self-developing film units, said apparatus comprising:

means for processing such a film unit in response to advancing the film unit relative to said processing means;

means for providing an output signal in response to each advancement of a film unit relative to said processing means;

a plurality of timers, each being operable upon actuation for timing the predetermined imbibition period; and means responsive to an output signal for selecting and actuating one of said plurality of timers to time the imbibition period of a corresponding processed film unit, said selecting and actuating means being configured so that said plurality of timers are actuated in a predetermined sequence in response to successive output signals.

2. The apparatus of claim 1 wherein said plurality of timers are arranged in consecutive order starting with a first timer and ending with a last timer and wherein said selecting and actuating means automatically operates in a single timing mode when none of said timers are in operation for automatically selecting and actuating said first timer in response to an output signal, and also operates in a multiple timing mode when one or more of said timers are in operation for automatically selecting and actuating the next non-operating timer in said predetermined sequence in response to an output signal.

3. The apparatus of claim 2 wherein during multiple timing mode operation said timers are sequentially actuated in their consecutive order on a repeating basis.

4. The apparatus of claim 1 further including a plurality of visual indicators, each associated with a corresponding one of said timers, for providing visible indications showing which timers are in operation.

5. The apparatus of claim 4 further including an audible indicator providing an audible signal at the end of an imbibition period timer by any of said plurality of timers.

* * * * *